US009032065B2

(12) United States Patent
Lioy et al.

(10) Patent No.: US 9,032,065 B2
(45) Date of Patent: May 12, 2015

(54) FAST LINK ESTABLISHMENT FOR NETWORK ACCESS

(75) Inventors: Marcello Lioy, San Diego, CA (US); Jun Wang, La Jolla, CA (US); Masakazu Shirota, Kanagawa (JP); Raymond Tah-Sheng Hsu, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 750 days.

(21) Appl. No.: 11/193,068

(22) Filed: Jul. 28, 2005

(65) Prior Publication Data

US 2006/0095962 A1     May 4, 2006

Related U.S. Application Data

(60) Provisional application No. 60/592,470, filed on Jul. 30, 2004.

(51) Int. Cl.
    *G06F 15/173*     (2006.01)
    *H04L 29/06*     (2006.01)
    *H04L 29/08*     (2006.01)

(52) U.S. Cl.
    CPC ............ *H04L 63/08* (2013.01); *H04L 63/10* (2013.01); *H04L 63/162* (2013.01); *H04L 67/14* (2013.01); *H04L 69/324* (2013.01)

(58) Field of Classification Search
    CPC ..................................................... H04L 63/08
    USPC ........................................................ 709/227
    See application file for complete search history.

(56) References Cited

U.S. PATENT DOCUMENTS

| 5,764,903 A * | 6/1998 | Yu ................................. 709/208 |
| 6,370,118 B1 | 4/2002 | Lioy et al. |
| 6,487,218 B1 * | 11/2002 | Ludwig et al. ................. 370/469 |
| 6,614,803 B1 | 9/2003 | Farnsworth et al. |
| 6,651,105 B1 | 11/2003 | Bhagwat et al. |

(Continued)

FOREIGN PATENT DOCUMENTS

| EP | 1434404 A | 6/2004 | ............. H04L 29/06 |
| EP | 1779631 A1 | 5/2007 | |

(Continued)

OTHER PUBLICATIONS

W. Simpson, "Request for Comments: 1661, The Point-to-Point Protocol (PPP)," Jul. 1994.*

(Continued)

*Primary Examiner* — Andrew Georgandellis
(74) *Attorney, Agent, or Firm* — Kristine U. Ekwueme

(57) ABSTRACT

A communication session between a node seeking network access and a NAS (Network Access Server) is established by having only few exchanges of messages. Upon detecting a physical link between the node and the NAS, the NAS immediately sends an authentication request message to the node. In response, the node sends a request message which includes all parameters options, in addition to responding to the authentication request message, for link configuration and network access control. The NAS then picks and chooses the parameter options and sends back the selected options in a reply message to the node. If the selected options in the reply message meet a threshold, the node straightforwardly transmits user data for network access via the NAS.

49 Claims, 9 Drawing Sheets

(56) References Cited

U.S. PATENT DOCUMENTS

| | | |
|---|---|---|
| 6,909,899 B2 | 6/2005 | Wang et al. |
| 7,366,151 B2 | 4/2008 | Kubler et al. |
| 7,453,844 B1 | 11/2008 | Lee et al. |
| 8,233,416 B2 | 7/2012 | Shirota et al. |
| 2002/0097707 A1 | 7/2002 | Balazinski et al. |
| 2002/0145993 A1 | 10/2002 | Chowdhury et al. |
| 2003/0099219 A1 | 5/2003 | Abrol et al. |
| 2003/0115266 A1 | 6/2003 | Sweet et al. |
| 2004/0090937 A1 | 5/2004 | Chaskar et al. |
| 2004/0114553 A1 | 6/2004 | Jiang et al. |
| 2005/0128956 A1 | 6/2005 | Hsu et al. |
| 2006/0095962 A1 | 5/2006 | Lioy et al. |
| 2008/0095084 A1 | 4/2008 | Nakahara et al. |

FOREIGN PATENT DOCUMENTS

| | | |
|---|---|---|
| JP | 2001086156 | 3/2001 |
| JP | 2002501331 | 1/2002 |
| JP | 2002291011 A | 10/2002 |
| JP | 2004201087 | 7/2004 |
| JP | 2005244388 | 9/2005 |
| JP | 200619934 | 1/2006 |
| KR | 20010001928 | 1/2001 |
| KR | 20030037894 | 5/2003 |
| KR | 20030050897 | 6/2003 |
| KR | 20030082570 | 10/2003 |
| RU | 2073913 | 2/1997 |
| RU | 2215376 | 10/2003 |
| WO | 9205556 | 4/1992 |
| WO | 9933307 | 7/1999 |
| WO | 9935798 | 7/1999 |
| WO | 02058358 A2 | 7/2002 |
| WO | 03065682 A1 | 8/2003 |
| WO | 2004045224 | 5/2004 |
| WO | 2005092501 | 10/2005 |

OTHER PUBLICATIONS

Droms R:, "Dynamic Host Configuration Protocol", IETG Standard, Internet Engineering Task Force, IETF, CH, Mar. 1997, pp. 1-45, XP 015007915.

Alexander et al., "DHCP Options and BOOTP Vendor Extensions", IETF Standard, Internet Engineering Task Force, IETF, CH, Oct. 1993, XP015007320.

Simpson W:, "The Point-to-Point Protocol (PPP)", RFC 2131, Jul. 1994, XP002150336.

IETF, "Darpa Internet Program Protocol Specification," RFC 791, Information Sciences Institute (Sep. 1981).

Simpson, W.: "PPP in HDLC-like Framing," RFC 1662 (Jul. 1994).

International Search Report—PCT/US05/027069—International Search Authority, European Patent Office, Dec. 7, 2005.

Written Opinion—PCT/US05/027069—European Patent Office—Dec. 7, 2005.

International Preliminary Report on Patentability—PCT/US05/027069—The International Bureau of WIPO, Switzerland—Jul. 29, 2005.

3GPP2 A.S0011-C, Version 1.0: "Interoperability Specification (IOS) for CDMA 2000 Access Network Interfaces," TIA-2001-D (Feb. 2005).

3GPP2 X.S0011-003-C, Version 1.0.0; 3rd Generation Partnership Project 2 "3GPP2" cdma2000 Wireless IP Network standard: Packet Data Mobility and Resource Management, pp. 1-24 (Aug. 2003) XP-002374163.

European Search Report—EP10182373, Search Authority—Munich Patent Office, Nov. 18, 2010.

RFC 2153; Simpson, W. "PPP Vendor Extensions", IETF, pp. 1-4 (May 1997) XP015007937.

Taiwan Search Report—TW094125852—TIPO—Dec. 20, 2011.

\* cited by examiner

FAST LINK ESTABLISHMENT FOR NETWORK ACCESS

CLAIM OF PRIORITY UNDER 35 U.S.C §119

The present Application for Patent claims priority to U.S. Provisional Application No. 60/592,470, entitled "Method and Apparatus for Fast Packet Data Session Establishment", filed on Jul. 30, 2004, and assigned to the assignee hereof and expressly incorporated by reference herein.

BACKGROUND

I. Field

The present invention generally relates to packet data communications, and more particularly, to initial communication sessions prior to establishing packet data communications for network access.

II. Background

Interconnecting of networks globally allows information to be swiftly accessed irrespective of geographical distances. FIG. 1 shows a simplified schematic drawing of the global connection of networks, commonly referred to as the Internet signified by the reference numeral 20. The Internet 20 is in essence many networks with different levels of hierarchy linked together. The Internet 20 is operated under the IP (Internet Protocol) promulgated by the IETF (Internet Engineering Task Force). Details of the IP can be found in RFC (Request For Comments) 791 published by the IETF.

Connected to the Internet 20 are various individual networks, sometimes called LANs (Local Area Networks) or WANs (Wide Area Networks) depending on the network sizes. Shown in FIG. 1 are some of such networks 22, 24 and 26.

Within each of the networks 22, 24, and 26, there can be various pieces of equipment connected to and in communication with each other. Examples are computers, printers, and servers, to name just a few, which are commonly called nodes. When a node communicates beyond its own network via the Internet 20, an IP address needs to be assigned to the node. The assignment of the IP address can be manual or automatic. The manual assignment of the IP address can be performed by a network administrator, for example. More often, the IP address is automatically assigned, for instance, by a dedicated server in the LAN.

Take an example for illustration. Suppose a node 30 in the network 22 attempts to send a data packet to another node 34 in the network 24. Under the IP, each data packet needs to have a source address and a destination address. In this case, the source address is the address of the node 30 in the network 22. The destination address is the address of the node 34 in the network 24.

Very often, node-to-node communications are required prior to network access, such as the Internet 20. For instance, suppose the node 30 in the network 22 is a laptop computer. The laptop computer node 30 has no direct access to the network 22. Nevertheless, the laptop computer node 30 may reach a NAS (Network Access Server) 32 in the network 22 via some other means, such as by dialing up a wired modem though a telephone line, for example. In that case, the node 30 typically establishes a PPP (Point-to-Point Protocol) session with the NAS (Network Access Server) 32 in the network 22. Packet data communications thereafter established between the node 30 and the network 22, or any other networks via the Internet 20, will be exchanged through the wired modem and the telephone line. If the modem transmits and receives signals serially and asynchronously through the telephone line, data packets exchanged over the telephone line also have to be framed accordingly to suit the serial and asynchronous modem link.

Advent in wireless technologies allows nodes to move away from their originally registered network to another network. For instance, referring back to FIG. 1, the node 30, instead of permanently wired to the network 22, can be a wireless device, such as a PDA (Personal Device Assistant), a cellular phone, or a mobile computer. The wireless node 30 can travel beyond the boundary of its home network 22. Thus, the node 30 may roam away from its home network 22 to a foreign network 26. To gain access of the network 26, or to be connected to other networks via the Internet 20, the node 30 also typically establishes a PPP session with a NAS (Network Access Server) 33 in the network 26. Communications between the node 30 and the NAS 33 in this case are through the air link. Again, data packets exchanged between the node 30 and the wireless network also have to be framed to fit into the format which is negotiated during the PPP session between the node 30 and the NAS 33 through the air link.

The bulk of the PPP is described in RFCs 1661 and 1662 published by the IETF. The PPP is a peer-to-peer protocol in which both nodes are peers. That is, neither party assumes the role of a client nor a server. Either party can request actions from or perform actions to the other. In essence, the PPP is an exploratory and negotiating session between nodes, during which session, the nodes find out from each other's resources in terms of capability and availability and finally converge to a set of mutually acceptable parameter options, prior to any network traffic flow.

FIG. 2 shows a sequence flow diagram of an exemplary PPP communication session 34 in which the node 30 in the network 26 seeks to establish a link with the NAS 32 for gaining access to the Internet 20.

The PPP has a number of protocol components. In the exemplary PPP session shown in FIG. 2, the PPP has a LCP (Link Control Protocol) 36, a CHAP (Challenge/Handshake Authentication Protocol) 38, and a IPCP (Internet Protocol Configuration Protocol) 40 as components.

First, upon completion of the physical link, that is, the node 30 and the NAS 33 are capable to reach each other at the hardware level, for example, there is a need to go through the LCP 36. The LCP 36 serves the purpose of establishing the basic communication link between the node 30 and the NAS 33. During the LCP 36, the node 30 and the NAS 33 exchange and negotiate essential communication parameter options with each other. The options can include, maximum size of the data packet through the link, parameters relating to quality control, HDLC (High Level Data Link Control) header field compression scheme used, and whether the peer is willing to be authenticated.

The processes for the LCP 36 are more or less operated under a handshake etiquette. First, the requesting party proposes one or more parameters by sending a Configure Request message. If any parameter is not recognized by the receiving party, the receiving party responds back with a Configure Reject message. If the rejected parameter is fatal to the sought link, the requesting party then has to terminate the PPP session.

On the other hand, if the parameter is recognized but the option related to the parameter is not acceptable, the responding party sends back a Configure Nak message. The requesting party again can either terminate the PPP session or send another Configure Request message with a different option for the same parameter.

As mentioned earlier, the PPP is a peer-to-peer protocol. Either the node 30 or the NAS 33 can be the requesting party.

The same holds true for the role of the responding party. All parameters with the associated options have to be negotiated and settled in manner as described above. Several rounds of negotiation may be required, as shown in FIG. 2. The overall negotiation scheme is basically a simplex process. If the requesting party determines that all the parameters needed are acceptable to the responding party, the requesting party sends a final Configure Ack message to the responding party. Once both parties have sent Configure Ack messages, they then transition to the authentication phase.

To ensure the parties are authorized, authentication has to be carried out. One way to perform authentication is to use the other PPP component CHAP 38. It is typically the NAS 33 that initiates the CHAP 38 to verify the identity of the node 30. During the CHAP 38, the NAS 33 sends a message called a challenge message to the node 30. Under the CHAP, there is a shared secret which is used along with the challenge message that is used to calculate a response message using a pre-agreed upon algorithm. The node 30 then sends the response message generated by the secret algorithm to the NAS 33. The NAS 33 thereafter compares the received response message with the message calculated by the NAS 33 itself. If there is a comparison match, the node 30 is said to pass the CHAP 38 in which the NAS 33 sends a CHAP Success message to the node 30. Otherwise, a CHAP Failure message is sent by the NAS 33.

Alternatively, instead of the CHAP 38, authentication can be accomplished by going through a PAP (Password Authentication Protocol). In the PAP, the node merely sends the NAS 33 a username and password for verification. If verified, the node 30 is said to pass the PAP.

If the node 30 needs IP access, information relating to IP again needs to be exchanged and negotiated. For example, among other things, the node 30 may need to have an assignment of an IP address in order to access the Internet 20 (FIG. 1) in accordance with the IP. To accomplish this end, negotiation and exchange of parameter options under the IPCP 40 commence. In the exemplary PPP session 34, the node 30 initially requests an IP address 0.0.0.0 from the NAS 33. In response, the NAS 33 sends a Configure Nak message, suggesting the node 30 use the IP address a.b.c.d. If accepted, the node 30 confirms the use of the IP address a.b.c.d by sending the NAS 33 another message for acknowledgement.

Finally, when the node 30 agrees to all the parameters negotiated during the IPCP 40, the node 30 sends an acknowledge message to the NAS 33. User data of the network access session are thereafter exchanged. The IP data packets of the network traffic are encapsulated into the PPP frames with parameters and negotiated during the LCP 36 earlier.

At the end of the network access, either the node 30 or the NAS 33 may send a Terminate Request message to the other, which thereafter responds back with a Terminate Ack message and conclude the communication session.

As can be seen in FIG. 2 and described above, there are quite a number of messages exchanged between the node 30 and the NAS 33 during the PPP session 34. As such, considerable time duration is involved. This is especially true if the PPP session 34 is negotiated over a slow link with high data latency.

Accordingly, there is need to provide a faster and more efficient way of establishing initial communication links prior to any next levels of data traffic.

SUMMARY

A communication session between a node seeking network access and a NAS (Network Access Server) is established by going through exchanges of only few messages. First, upon setting up a physical link between the node and the NAS, the NAS immediately sends an authentication request message to the node. In response, the node sends a request message which includes, in addition to the authentication response, all other parameters options for link configuration and network access control. The NAS then picks and chooses a set or parameter options out of many and thereafter sends back the selected options in a reply message to the node. If the selected options in the reply message meet a threshold, the node straightforwardly transmits user data for network access via the NAS.

Furthermore, fail-over features can be implemented in which if the communication session in accordance with the exemplary embodiment of the invention cannot be established, the conventional PPP (Point-to-Point Protocol) can take over to continue with the communication session.

In accordance with one aspect of the invention, disclosed is a method, apparatus, and medium in which a node seeking network access, comprising the steps of or means for providing a set of parameter options for authentication, link configuration, and network access in a message, and sending the message to a network access node.

In accordance with another aspect of the invention, disclosed is another method, apparatus, and medium for a network access node, comprising the steps of or means for receiving from a node seeking network access a message including a set of parameters options for authentication, link configuration, and network access, and sending to the node seeking network access another message which concerns with authorization of the set of parameter options.

These and other features and advantages will be apparent to those skilled in the art from the following detailed description, taken together with the accompanying drawings, in which like reference numerals refer to like parts.

DETAILED DESCRIPTION

The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

Figure 3:
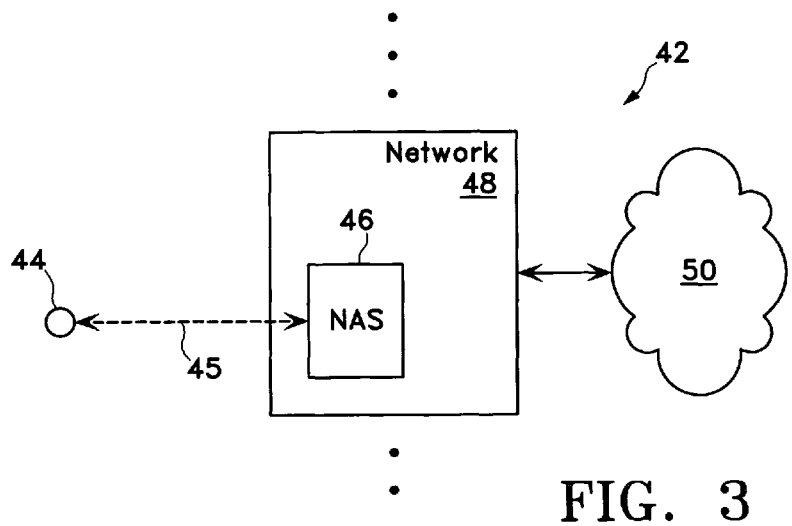
FIG. 3 is a schematic drawing of the nodes involved in an exemplary embodiment of the invention.

FIG. 3 shows a simplified schematic drawing of the nodes involved in an exemplary embodiment of the invention. The overall communication system is signified by the reference numeral 42. In this embodiment, the communication system 42 includes a network 48 connected to a backbone network 50 which can be an intranet or the Internet. Disposed in the network 48 is a NAS (Network Access Server) which serves as a gateway between the network 48 and any node that seeks network access. Suppose in the system 42, there is such a node 44 that looks for access of either the network 48 or other networks (not shown) via the backbone network 50. The node 44 communicates with the NAS 46 through a communication link 45.

The link 44 can be a link which assumes various forms. For example, the link 44 can be a wire link, such as a conventional telephone wire connection, a coaxial cable link, or an optical cable link, to name just a few. Furthermore, the link 45 can also be a wireless link. In that case, the link 45 is the air interface.

Suppose in this embodiment, the link 45 is the air interface. The node 44 is a mobile device which communicates with the NAS 46 wirelessly. The network 48 supports wireless technologies such as the cdma2000 standards as set forth by the TIA/EIA (Telecommunications Industry Associations/Electronic Industries Associations). The NAS 46 in this instance is a PDSN (Packet Data Serving Node) coupled with a RAN (Radio Access Network) which communicates with the node 44 via RF (Radio Frequency) signals through the air link 45. The PDSN and RAN are known in the art and not shown in FIG. 3 for reasons of clarity and brevity.

Prior to describing the operational details of the communication system 42, it helps to explain first the various types of protocols with different levels of hierarchy and their mutual relationships.

In the art of network communications, protocols are hierarchized in accordance with the OSI (Open System Interconnection) model, as set forth by the ISO (International Organization for Standardization) and the ITU-T (Internatinal Telecommunication Union-Telecommunications Standards Sector). The purpose is to facilitate multi-vendor equipment interoperability. That is, each level of protocol hierarchy has its own specifications. As such, as long as the specifications of a particular hierarchy level are met, developments of products in that level are assured to be compatible with other products in other levels.

Figure 4:
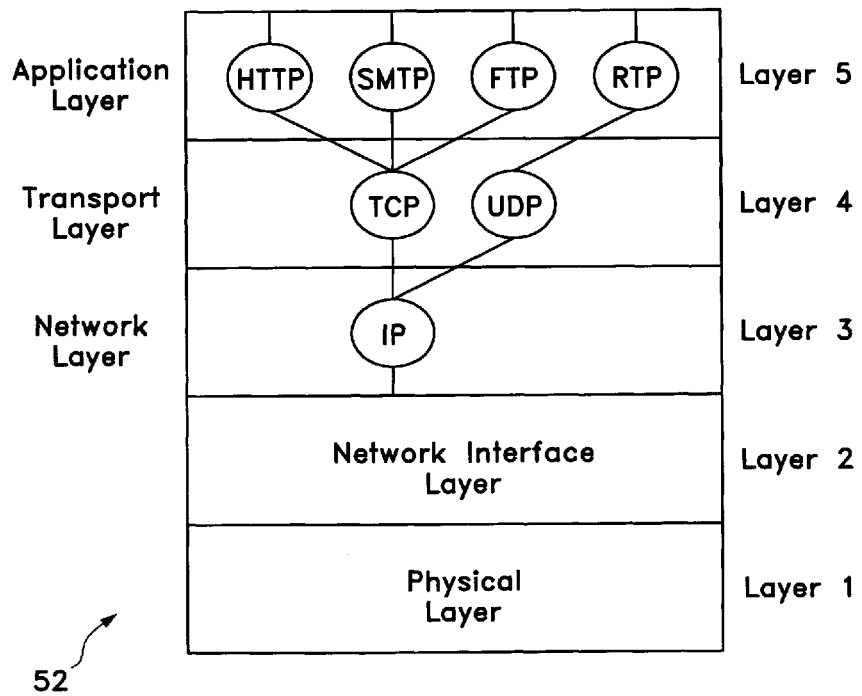
FIG. 4 is a schematic drawing showing a stack of protocols in hierarchical order.

Suppose the system 42 in FIG. 3 supports the IP (Internet Protocol). FIG. 4 schematically shows a stack of protocols in hierarchical order, commonly referred to as the "protocol stack," and is generally signified by the reference numeral 52. The IP protocol stack 52 is structured in accordance with the IETF (Internet Engineering Task Force) model which is similar to but not exactly the same as the OSI model. In accordance with the IETF model, the IP protocol stack 52 has five layers, starting from Layer 1 to Layer 5. Thus, a data packet sent out by a node, such as the node 44 or 46 shown in FIG. 3, has to be processed through the protocol stack 52. The stack of protocols 52 is built in the node in the form of software or hardware, or combination thereof. Likewise, a data packet received by the same node has to be processed through the protocol stack 52 but in the reverse order.

Take an example for illustration. Suppose a data packet is processed to be sent out from a node, such as the node 44 or 46 (FIG. 3), the data packet is first created in accordance with one of the protocols in the application layer, i.e., Layer 5. Layer 5 includes the HTTP (Hyper Text Transfer Protocol), SMTP (Service Mail Transfer Protocol), FTP (File Transfer Protocol) and the RTP (Real Time Transfer Protocol). Further suppose the data packet is a product of a VoIP (Voice over Internet Proctocol) session. The data packet thus has to be formatted in accordance with the RTP in Layer 5.

Time sensitive data packets, such as the data packet resulted from the RTP protocol in Layer 5, need to be processed in real time. Specifically, defective packets are not normally resent but instead simply dropped so as not to obstruct transmissions of other oncoming data packets. RTP data packets are therefore normally carried via the UDP (User Data packet Protocol) in Layer 4, the transport layer. Accordingly, the data packet from the RTP in Layer 5 has further to be formulated in accordance with the UDP in Layer 4.

On the other hand, if the data packet originates from other protocols in the Layer 5, such as the FTP, the data packet is normally sent via the TCP (Transport Control Protocol) in Layer 4. Under the TCP, accurate delivery of the data packet is of significant importance. As such, defective packets are always resent, albeit possibly slowing down the overall data transmission process.

Data packets after passing through this transport layer, Layer 4, are added with information such as the source and destination port numbers.

The data packet after going through the transport layer, Layer 4, is then sent to the network layer, Layer 3, for processing. In this particular case, the resultant data packet from Layer 4 has to be formatted again in accordance with the IP, for instance, with the source and destination addresses of the data packet added.

It should be noted that for reason of brevity, only the IP in Layer 3 is shown in FIG. 4. There are other protocols which perform supplemental functions to the IP also existent in Layer 3. An example is the ICMP (Internet Control Message Protocol) which serves the purpose of sending error messages for undeliverable data packets.

Thereafter, the data packet has to be framed to fit into whatever protocol is applicable in the network interface layer, Layer 2. The PPP (Point-to-Point Protocol) described previously is classified as a Layer 2 protocol. The communication protocol session prior to network access in accordance with the exemplary embodiment of the invention also concerns with the network interface layer.

The bottom-most layer of the protocol stack 52 in FIG. 4 is the physical layer, Layer 1, which deals with the physical implementation of the transmission for the data packet. For example, if the communication link 45 (FIG. 3) is a conventional wire link, the physical layer, Layer 1, concerns with hardware circuitry on both the nodes 44 and 46 (FIG. 3) driving signals though the conductive wires which make up the link 45. If the communication link 45 is the air interface, the physical layer, Layer 1, relates to the air space and the hardware circuitry on both nodes 44 and 46 (FIG. 3) transceiving signals over the air space.

As for a data packet received by the node, such as the node 44 and 46 (FIG. 3), the data packet has to be processed through the same protocol stack 52 but in the reverse order, that is, from Layer 1 to Layer 5.

Reference is now returned to FIG. 3. Suppose in this example, the node 44 seeks network access via the NAS 46. Prior to any exchange of messages, the physical link 45 must be ready to carry signals. Phrased differently, the physical layer, Layer 1, of the nodes 44 and 45 must be physically present and established.

In this embodiment, as mentioned earlier, the communication link 45 is the air interface and the wireless technology supported by the network 48 is cdma2000. The physical layer concerns with wireless circuitry in the node 44, and the RAN within the NAS 46. The RAN may include at least one BSC (Base Station Controller) and a plurality of BSs (Base Stations). The RAN, BSC and BSs are not shown in FIG. 3.

In accordance with this embodiment, once the physical layer, Layer 1, is established, that is, both the nodes 44 and 46 detect the mutual physical presence of each other, the NAS 46 immediately sends out a first message to the node 44.

Figure 5:
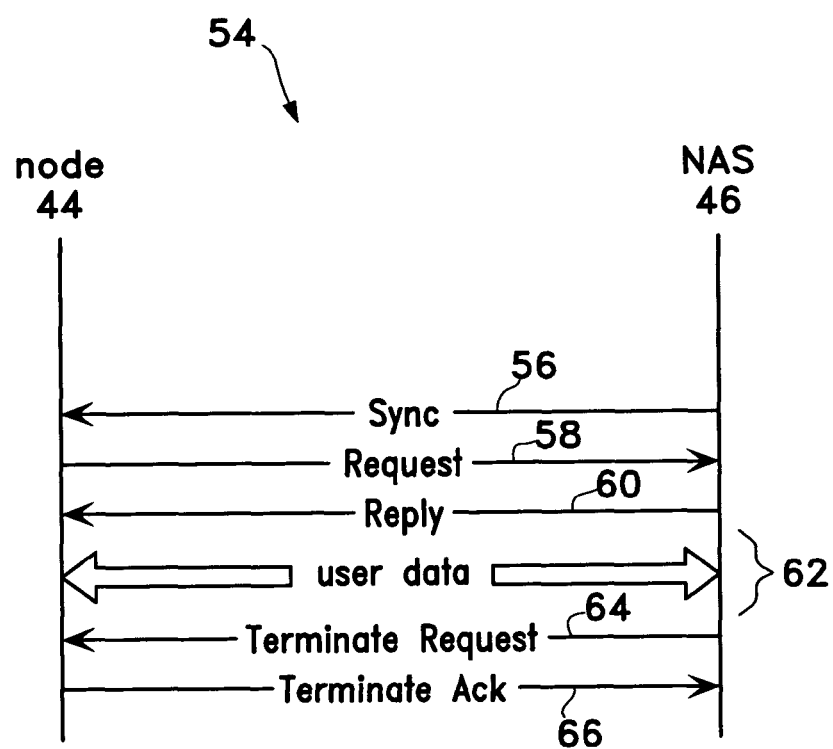
FIG. 5 is a communication sequence diagram of a communication session in accordance with the exemplary embodiment of the invention.

FIG. 5 is a flow diagram showing the communication sequence of messages between the node 44 and the NAS 46. The overall flow process is designated by the reference numeral 54.

The first message is called a Sync message and is signified by the reference numeral 56. The Sync message 56 includes all possible authentication options for the node 44 to select from. The options may include a challenge message under the CHAP (Challenge Authentication Protocol), and a request for password and username required by the PAP (Password Authentication Protocol). Other than the CHAP and PAP, in the Sync message 56, other authentication protocols that are defined or supported in the PPP should also be included.

Upon receipt of the Sync message 56, the node 44 responds with a Request message 58, as shown in FIG. 5.

In the Request message 58, the node 44 includes necessary authentication information in response to the requests as set forth in the Sync message 56. In addition, the node 44 also includes in the Request message 58 all parameter options needed for establishing the link for the node 44 for subsequent network access via the NAS 46. It makes no difference whether the parameters with the associated options are related to link configuration, authentication, or network access control. That is, instead of classifying the parameters according to the functions of the protocol components such as the LCP (Link Control Protocol), CHAP (Challenge Handshake Authentication Protocol) and IPCP (Internet Protocol Control Protocol) as described previously with respect to the PPP, in the Request message 58 of this embodiment, all parameters with the options are included irrespective of functions. More specifically, the parameters with the options in the Request message 58 can include a response to the challenge message, or user name and password if applicable, link configuration parameters of the link 45 such as the datagram size and HDLC (High Level Data Link Control) header field compression scheme, as well as parameters for network access such as an IP address, DNS (Domain Name System) configuration, and IP header compression protocol if applicable, and so forth.

It should be noted that the Request message 58 is preferably formatted with intentional redundancy in terms of choices so as to allow the NAS 46 to select the options that are supported by both nodes 30 and 46, thereby allowing both nodes 44 and 46 to conclude the overall process of the initial link establishment expeditiously. Out of the variety of choices, the NAS 46 may selectively choose the parameters with the associated options that are clearly supported for the purpose of increasing the chance of a successful link, thereby curtailing the set up time. Phrased differently, the Request message 58 essentially acts as an advertisement message with all the available parameter options supported by the node 44 in which selecting a subset of the options by the NAS 46 should allow the consummation of the link process.

Accordingly, as shown in FIG. 5, the NAS 46 responds with a Reply message 60 upon receipt of the Request message 58. In the Reply message 60, the NAS 46 selects options out of the various choices. The Reply message 60 includes the selected parameter options with their associated configuration values. Very often, the Reply message 60 is the last message needed prior to the commencement of network traffic by the node 44.

Unlike other protocol methods, such as the peer-to-peer PPP protocol described previously, in accordance with this embodiment, there is no need for any confirmation messages to acknowledge or negatively acknowledge. As such, in response to any message, be it the Sync message 56, the Request message 58, or the Reply message 60, neither Ack nor Nak messages are needed. The response node merely proceeds to the next step. No response on any particular requested item implies such item is unavailable or unsupported.

Returning back to FIG. 5, upon receipt of the Reply message 60, if the selected options by the NAS 46 meets a certain threshold, for example, all the selected options allow the node 44 to establish a communication link for network access, the node 44 proceeds straightforwardly to transmitting user data 62 to the NAS 46. Again, no acknowledge message is sent out by the node 44.

At the end of the network access, either the node 44 or the NAS 46 may send a Terminate Request message 64 to the other, which thereafter responds back with a Terminate Acknowledge message 66 and conclude the communication session.

In less occurred occasions, there can be insufficient configuration options in the Request message 58 for the NAS 46 to establish the link for network access sought by the node 44. That is, the selected options by the NAS 46 in the Reply message 60 may be insufficient to meet the required threshold for the node 44 to establish the network access link. The NAS 46 nevertheless sends the Reply message 58 with only the accepted options, but with unaccepted options left out. Again, no Nak message is necessary. As mentioned earlier, proposed options included in the Request message 58 but left out in the Reply message 60 implicitly indicate the lack of supports for the left out options. In this case, the NAS 46 cannot establish network traffic and waits for the node 44 to send a new Request message.

As for the node 44, if it opts for the link despite the left out parameter options for lack of support in the Reply message 60, for example, the left-out options are non-fatal, the node 44 can start transmitting network traffic. On the other hand, if the left-out parameters are absolutely needed to establish a network access link, e.g., the IP address requested by the node 44 is left out in the Reply message 60, no network traffic can be established and the link is said to fail.

Figure 6:
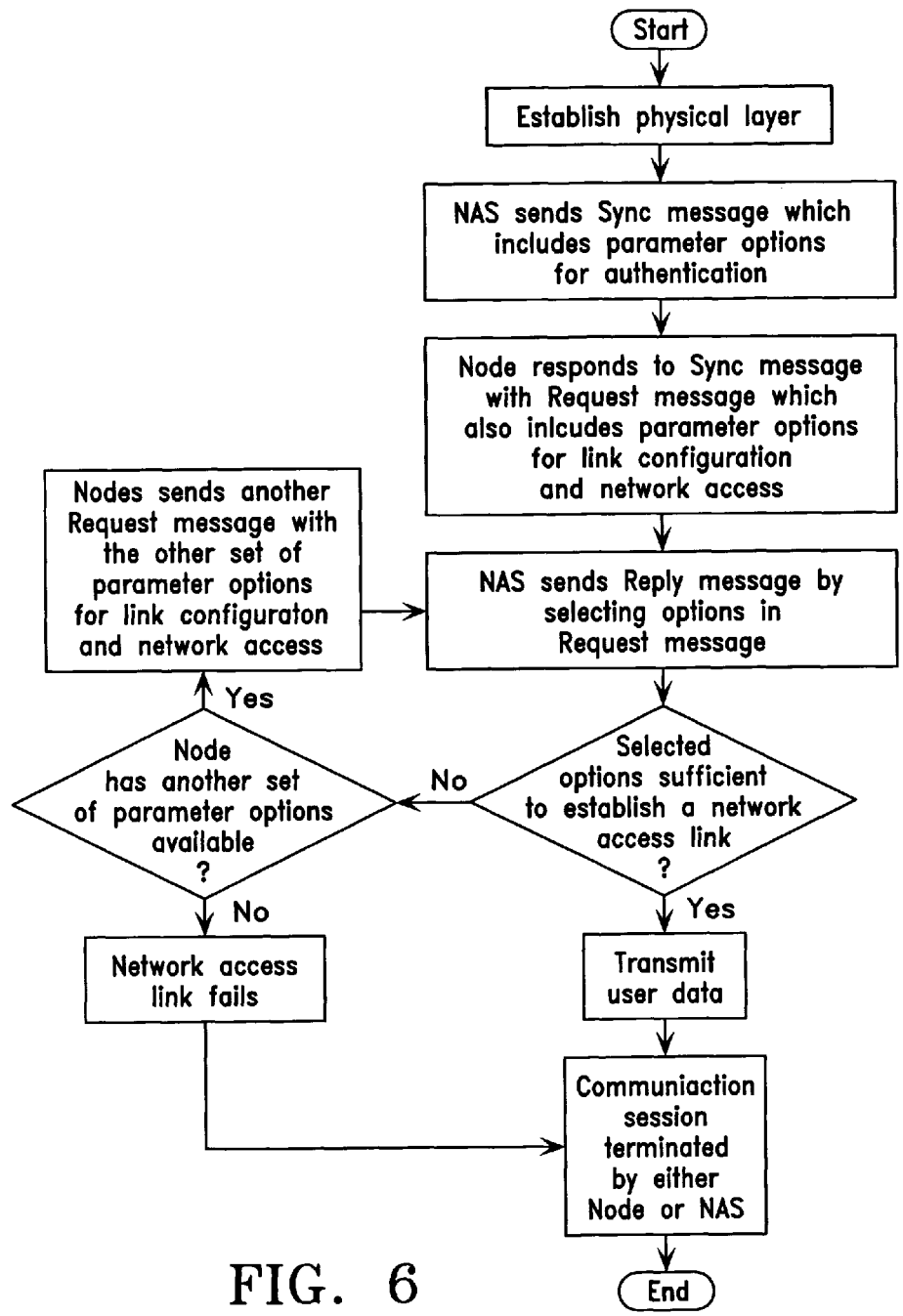
FIG. 6 is a flowchart showing the steps involved in accordance with the exemplary embodiment of the invention.

The overall process 54 is also shown in the flowchart of FIG. 6.

The link establishment process of the invention is also configured to have fail-over features to other link protocols. In this embodiment, if the link process 54 shown in FIGS. 5 and 6 is not supported in either the node 44 or the NAS 46 (FIG. 3), the conventional PPP steps in as a fallback protocol to continue with the link process leading to eventual network access sought by the node 44.

In essence, there can be two possibilities, respectively described hereinbelow.

Figure 7:
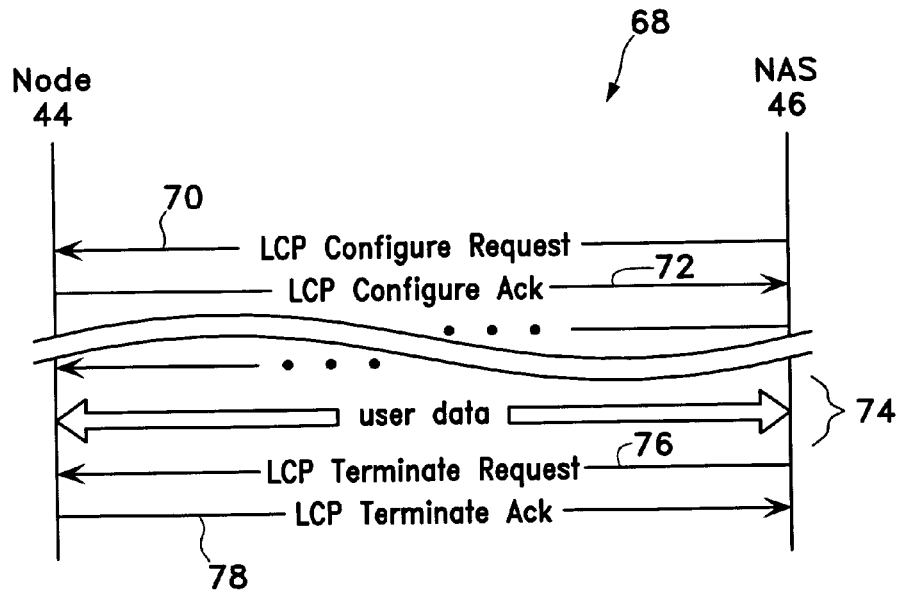
FIG. 7 is a communication sequence diagram showing the exemplary embodiment implemented with a fail-over feature to the conventional protocol.

The first scenario arises when the node 44 supports the link process 54 but NAS 46 does not. Reference is now directed to FIG. 7 in conjunction with FIG. 3. FIG. 7 is a flow diagram which shows the communication sequence of messages between the node 44 and the NAS 46 under this scenario. The overall flow of messages is signified by the reference numeral 68. Since it is assumed that the node 44 supports the link process 54, upon establishing the physical layer, Layer 1, between the nodes 44 and 46, the node 44 awaits the Sync message 56. However, the NAS 46 has no Sync message 56 to send because it is also assumed that the NAS 46 does not support the link process 54. Instead, the NAS 46 sends a LCP Configuration Request message 70 under the PPP to the node 44.

Upon receipt of the LCP Configure Request message 70, the node 44 immediately knows that the NAS 46 does not support the link process 54 and swiftly take actions to communicate with the NAS 46 via the conventional PPP. Specifically, in response to the LCP Configure Request message 70, the node 44 sends a LCP Configure Ack message 72, as shown in FIG. 7. Alternatively, the node may send a Configure Nak message if the proposed LCP options in the Configure Request message 70 are not desirable, in a manner similar to the conventional PPP.

It should be noted that in this embodiment, either the node 44 or the node 46 recognizes whether the message received is a PPP message or a non-PPP message. As will be described later, the data frame format used in this embodiment is the same as that used for the PPP, thereby allowing fast message recognition and differentiation.

Figure 1:
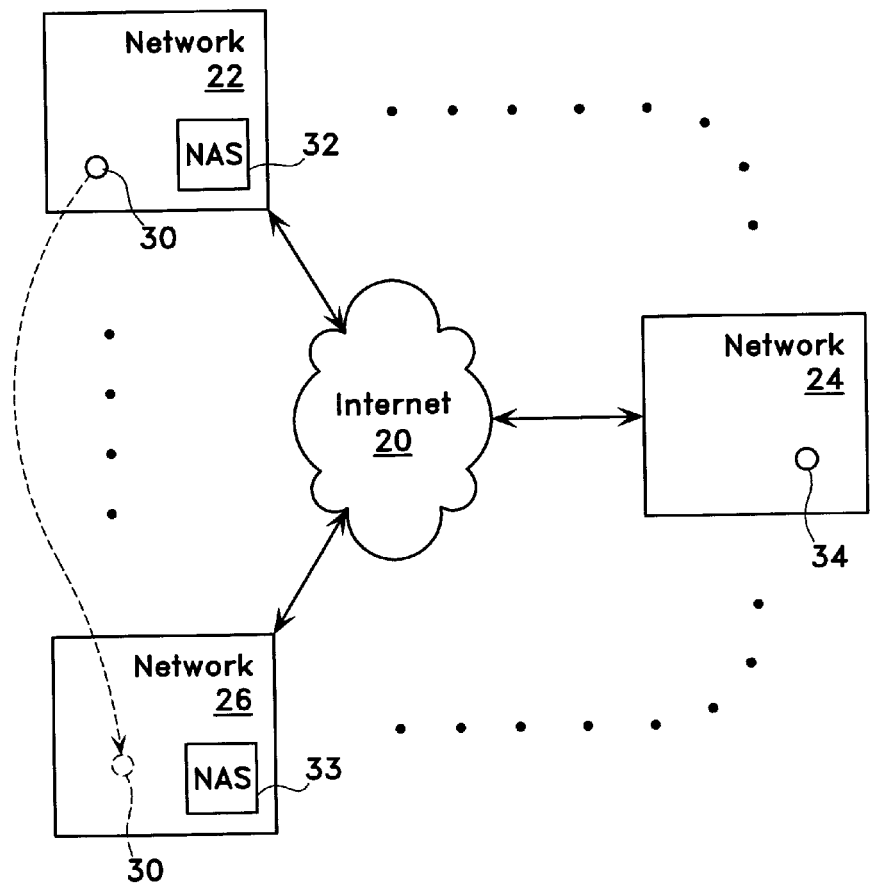
FIG. 1 is a schematic drawing of the global connection of networks.
Figure 2:
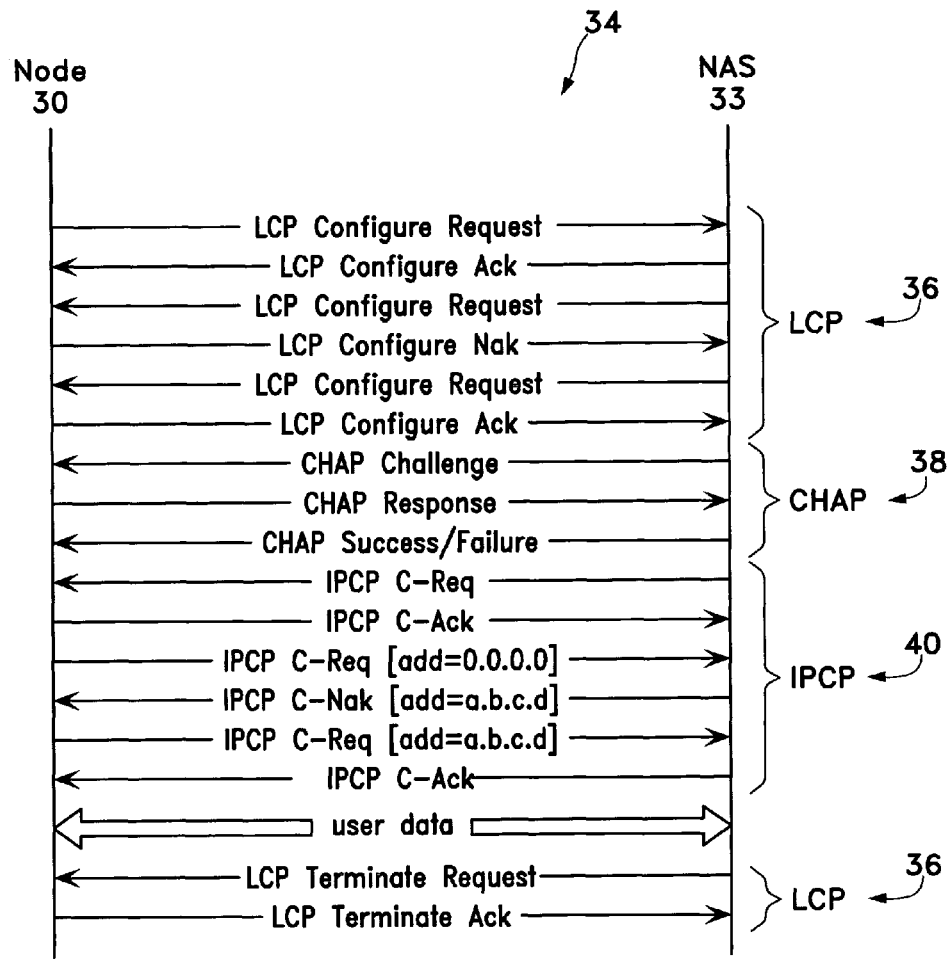
FIG. 2 is a communication sequence diagram of a communication session of a conventional protocol.

The rest of the process is substantially similar to the process 34 shown in FIG. 2. That is, after a successful link, data traffic 74 is established between the node 44 and the NAS 46. At the end of the network access, either the node 44 or the NAS 46 may send a Terminate Request message 76 to the other, which thereafter responds back with a Terminate Acknowledge message 78 and conclude the communication session 68.

Figure 8:
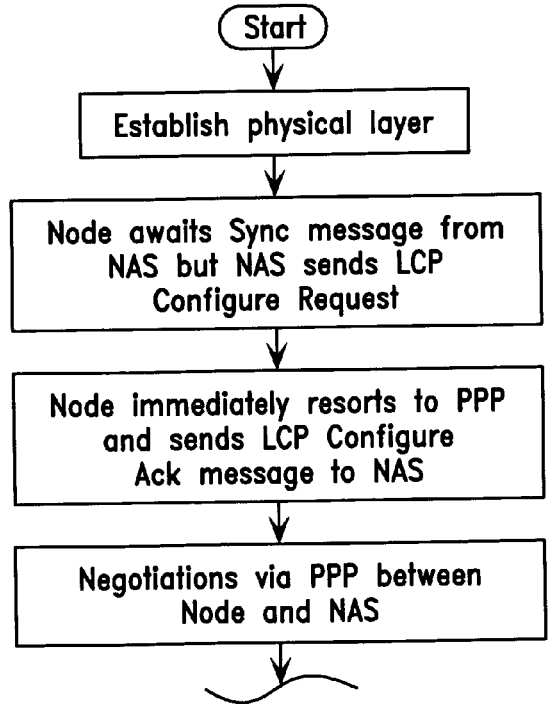
FIG. 8 is a corresponding flowchart for the communication sequence diagram of FIG. 7.

The corresponding flowchart for the process 68 is shown in FIG. 8. The conventional PPP steps are not shown in FIG. 8 for the sake of brevity.

Figure 9:
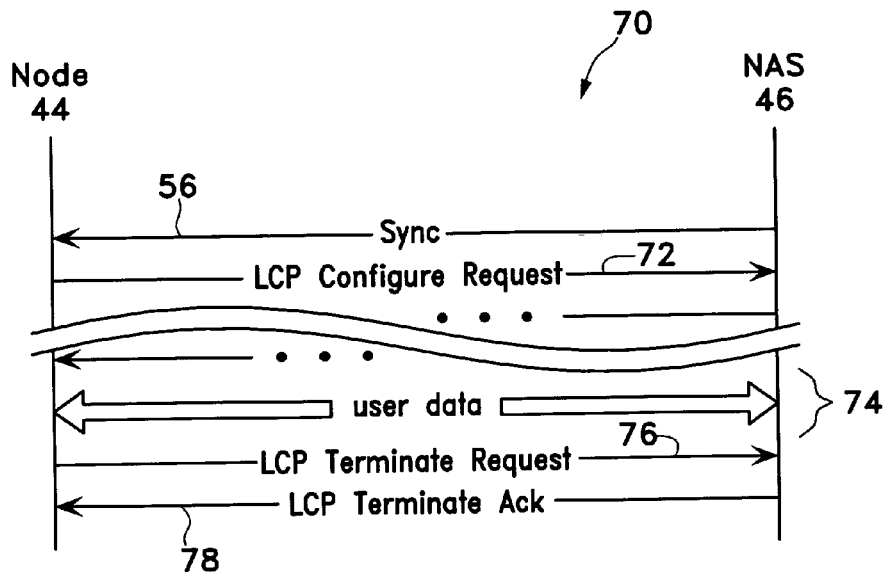
FIG. 9 is another communication sequence diagram showing the exemplary embodiment implemented with another fail-over feature to the conventional protocol.

The second scenario occurs when the NAS 46 supports the link process 54 but node 44 does not. Reference is now directed to FIG. 9 in conjunction with FIG. 3. FIG. 9 is a flow diagram showing the communication sequence of messages between the node 44 and the NAS 46 under this scenario. The overall flow of messages is signified by the reference numeral 70. Since it is assumed that the NAS 46 supports the link process 54, upon establishing the physical layer, Layer 1, between the nodes 44 and 46, the NAS 46 immediately sends out a Sync message 56 to the node 44. Since it is also assumed that the node 44 does not support the link process 54, upon receipt of the Sync message 56, the node 44 does not recognize the Sync message 56. As mentioned previously and will further be explained below, the node 44 can distinguish a PPP message from a non-PPP message. Thus, with the unrecognized Sync message 56, the node 44 rejects the unrecognized Sync message 56 using the standard PPP procedures. Instead, the node 44 sends out a LCP Configure Request message 72 upon the physical link established between the node 44 and the NAS 46.

If the NAS 46 receives the LCP Configuration Request message 72 or a PPP rejection of the Sync message 56, the NAS 46 immediately disables all features relating to the link process 54 (FIGS. 5 and 6) and goes through the conventional PPP process 34 as shown in FIG. 2 and described previously.

After a successful link, data traffic 74 can be exchanged between the node 44 and the NAS 46. At the end of the network access, either the node 44 or the NAS 46 may send a Terminate request message 76 to the other, which thereafter responds back with an Terminate acknowledge message 78 and conclude the communication session 70.

Figure 10:
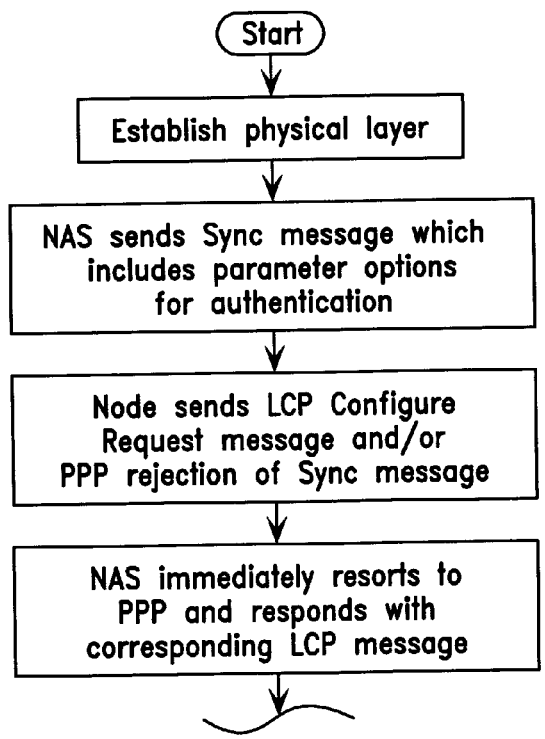
FIG. 10 is a corresponding flowchart for the communication sequence diagram of FIG. 9.

FIG. 10 shows the corresponding flowchart for the process 70. The conventional PPP steps are not shown in FIG. 10 for reasons of brevity and clarity.

Figure 11:
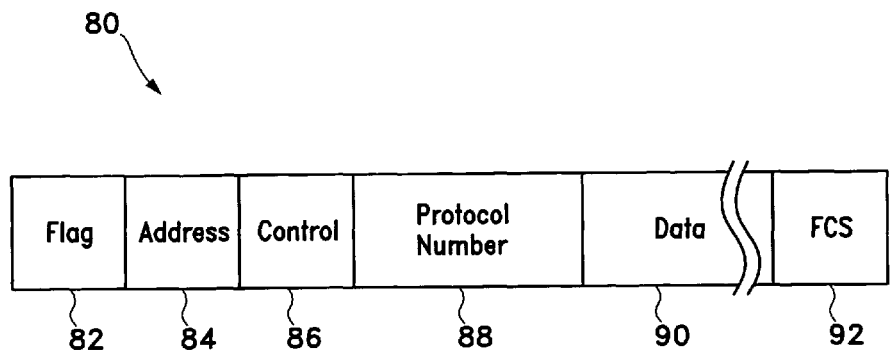
FIG. 11 is a schematic drawing of part of the circuitry of a node seeking network access in accordance with the exemplary embodiment.

FIG. 11 shows the data frame format used in the flow process 54 (FIG. 5). The frame template for the data packet of the process 54 is signified by the reference numeral 80. In essence, the template 80 is similar to corresponding data packet template used by the PPP as set forth under RFC 1662. In particular, the data frame 80 includes a flag field 82, an address field 84, a control field 86, a protocol number field 88, a data field 90, and a FCS (Frame Check Sequence) field 92.

The flag field 82 is one-byte long and indicates the start of a data packet frame. The flag field 82 always assumes the hexadecimal value of 7E and is the same value used for the link process 54 and the PPP, as required by the RFC 1662.

The address field 84 is also one-byte long and is always set to the hexadecimal value of FF, as also set forth in the RFC 1662.

The control field 86 is one-byte long and is fixed at the hexadecimal value of 03, as also mandated by the RFC 1662.

In the protocol number field 88, the value in this field indicates what the data packet 80 is. The protocol number field 88 is two-byte in length. For example, as defined in RFCs 1661 amd 1662, each of the LCP messages, such as the Configure Request message 70, has a hexadecimal value of C021. In this embodiment, each of the messages, such as the Sync message 56, the Request message 58 or the Reply message 60, used in the link process 54 (FIG. 5) has a unique protocol value different from that of any of the protocol values used in the PPP. As such, it can easily be distinguished whether the data packet 80 is a PPP packet or not a PPP packet.

The data field 90 has a length which ranges from zero to more bytes of payload that contains either data or control information. For instance, if the value in the protocol number field 88 with a value that indicates that the data packet 80 is the Request message 58, the data field includes all the information relating to the parameter options as aforementioned. As another example, if the value in the protocol number field 88 has a value that indicates that the data packet 80 is user data 62 (FIG. 5), the IP data packet generated from Layer 3 is entirely encapsulated into the data field 90.

The FCS field 92 ranges from two to four bytes in length and contains codes, such as the CRC (Cyclic Redundancy Code), for the frame 80 to provide basic protection against errors during transmission.

Figure 12:
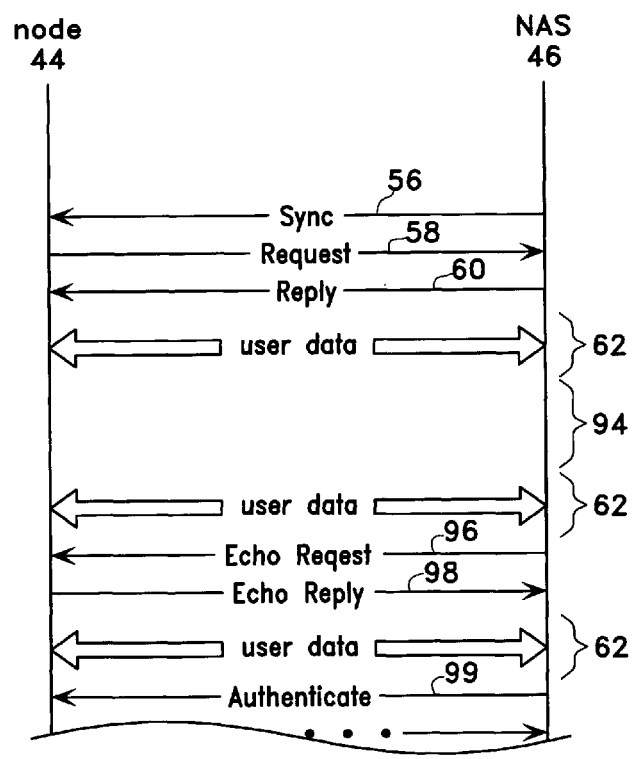
FIG. 12 is a communication sequence diagram of the communication session of FIG. 1 implemented with additional message types.

In addition to the Sync message 56, Request message 58, Reply message 60, Terminate Request 64, and Terminate Ack message as mentioned above (e.g., see FIG. 5), other types of messages can also be implemented in the link establishment process 54. FIG. 12 shows few examples.

Reference is now directed to FIG. 3 in conjunction with FIG. 12. For instance, after a prolong period of inactive communication, signified by the reference numeral 94 in FIG. 12, either the node 44 or the NAS 46 may send an Echo Request message 96 to the other party to inquire about the status of the party or the link 45. For example, if there is no physical link established for the link 45 due to power failure, the sending party would receive no response from the Echo Request message 45. Accordingly, the sending party may want to terminate the communication session 54. On the other hand, if the link 45 is still physically alive, the receiving party may respond to the Echo Request message 96 by sending an Echo Reply message 98. The sending party may thereafter forego the decision to terminate the communication session 54. The duration of the time period 94 can be predetermined.

In the midst of exchanges of user data 62, the NAS 46 may send an Authenticate message 98 to the node 44 requesting information for further authentication. For instance, during regular data traffic, the node 44 may need to access sensitive information which can only be reached by certain users. As such, the NAS 46 may send out the Authenticate message 99 message to the node 44 for further authentication. In addition to the authentication protocols such as PAP and CHAP as mentioned above, other more elaborate protocol schemes known in the art can also be used. An example can be the EAP (Extended Authentication Protocol) employing an external server, such as an AAA (Authentication, Authorization, and Accounting) server located either within or outside the network 48 for authentication.

Figure 13:
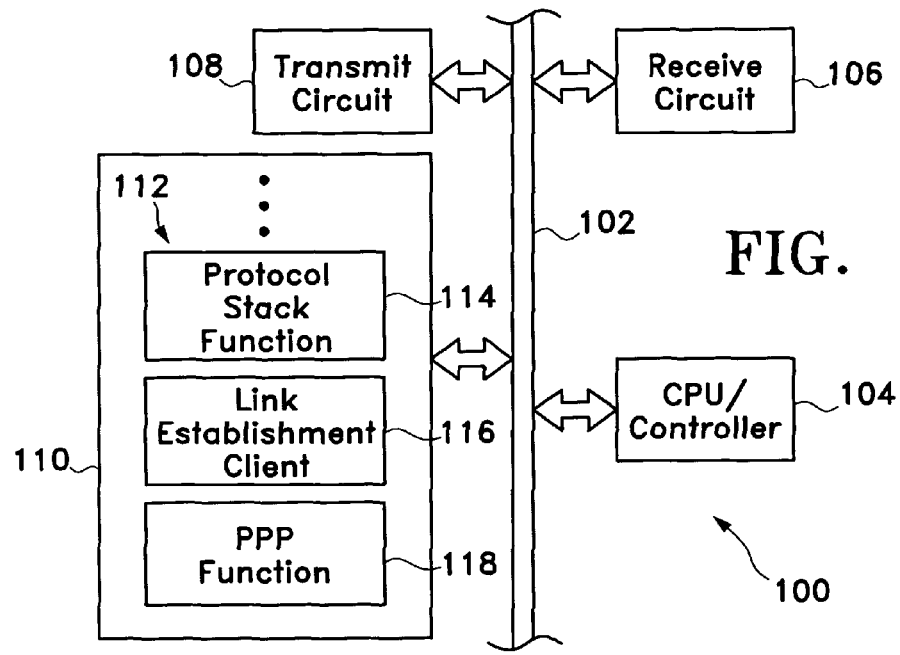
FIG. 13 is a schematic drawing of part of the circuitry of a node seeking network access in accordance with the exemplary embodiment.

FIG. 13 schematically shows the part of the hardware implementation of a an apparatus, such as the node 44 shown in FIG. 3, signified by the reference numeral 100 in accordance with the exemplary embodiment of the invention. The apparatus 100 can be built and incorporated in various forms, such as a laptop computer, a PDA, or a cellular phone, for example.

The apparatus 100 comprises a central data bus 102 linking several circuits together. The circuits include a CPU (Central Processing Unit) or a controller 104, a receive circuit 106, a transmit circuit 108, and a memory unit 110.

If the apparatus 100 is a wireless device, the receive and transmit circuits 106 and 108 can be connected to a RF (Radio Frequency) circuit but is not shown in the drawing. The receive circuit 106 processes and buffers received signals before sending out to the data bus 102. On the other hand, the transmit circuit 108 processes and buffers the data from the data bus 102 before sending out of the device 100. The CPU/controller 104 performs the function of data management of the data bus 102 and further the function of general data processing, including executing the instructional contents of the memory unit 110.

Instead of separately disposed as shown in FIG. 13, as an alternative, the transmit circuit 108 and the receive circuit 106 can be parts of the CPU/controller 104.

The memory unit 110 includes a set of instructions generally signified by the reference numeral 112. In this embodiment, the instructions include, among other things, portions such as the protocol stack function 114, link establishment client 116, the PPP function 118. The protocol stack function 114 runs the protocol stack similar to the stack 52 as shown and described in FIG. 4 previously. The link establishment client 116 includes the instructional sets in accordance with the process, such as the processes described in FIGS. 5-10 described above. The PPP function 118 includes the instructional sets for allowing the apparatus 102 to execute the PPP process. The PPP function 118 can be used independently or as a fallback from the link establishment client 116, as also described previously.

In this embodiment, the memory unit 110 is a RAM (Random Access Memory) circuit. The exemplary instruction portions 114, 116 and 118 are software routines or modules. The memory unit 110 can be tied to another memory circuit (not shown) which can either be of the volatile or nonvolatile type. As an alternative, the memory unit 110 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

Figure 14:
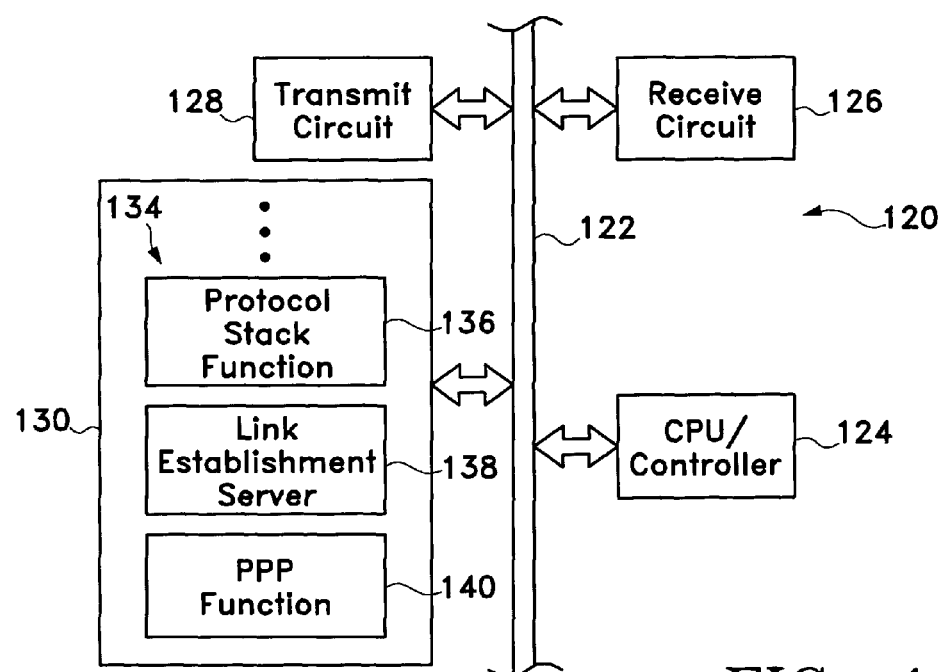
FIG. 14 is a schematic drawing of part of the circuitry of a network access node in accordance with the exemplary embodiment.

FIG. 14 schematically shows the part of the hardware implementation of another apparatus, such as the NAS 46 shown in FIG. 3, in accordance with the invention and is signified by the reference numeral 120. The apparatus 120 comprises a central data bus 122 linking several circuits together. The circuits include a CPU (Central Processing Unit) or a controller 124, a receive circuit 126, a transmit circuit 128, and a memory unit 130.

The receive and transmit circuits 126 and 128 can be connected to a network data bus (not shown) where the apparatus 120 is linked to. The receive circuit 126 processes and buffers received signals from the network data bus (not shown) before routing to the internal data bus 122. The transmit circuit 128 processes and buffers the data from the data bus 122 before sending out of the apparatus 120. The CPU/controller 124 performs the duty of data management of the data bus 122 and for the function of general data processing, including executing the instructional content of the memory unit 130.

Again, instead of separately disposed as shown in FIG. 14, the transmit circuit 128 and the receive circuit 126 can be parts of the CPU/controller 124.

The memory unit 130 includes a set of instructions generally signified by the reference numeral 134. In this embodiment, the instructions include portions, among other things, a protocol stack function 136, a link establishment server 138, and a PPP function 130. The protocol stack function 136 runs the protocol stack similar to the stack 52 as shown and described in FIG. 4 previously. The link establishment server 138 includes the instructional sets in accordance with the process, such as the processes shown in FIGS. 5-10 and as described above. The PPP function 140 includes the instructional sets for allowing the apparatus 120 to execute the PPP process. The PPP function 140 can be executed independently or as a fallback from the link establishment server 138, as also described previously.

The memory unit 130 can be made of memory circuit types as mentioned above and are not further repeated.

It should also be noted that the processes 54, 68 and 70 as described and shown in FIGS. 5-10 can also be stored or transmitted on any computer-readable medium known in the art. In this specification and the appended claims, the term "computer-readable medium" refers to any medium that participates in providing instructions to the CPU/controllers 104 and 124 respectively shown and described in FIGS. 12 and 13 for execution. Such a computer-readable medium if of the storage type may take the form of a volatile or non-volatile storage medium similar to the circuit types for memory units 110 and 130, as also described previously. Such a computer-readable medium if of the transmission type may include a coaxial cable, a metal wire, an optical cable, and the air interface carrying acoustic or electromagnetic waves capable of carrying signals readable by machines or computers, for example.

Finally, described in the embodiment, the Layer 3 protocol is described as the IP. The IP can be of different versions, such as the IPv4 (Internet Protocol version 4) and the IPv6 (Internet Protocol version 6). Furthermore, it should be noted that other Layer 3 protocols are equally applicable. For instance, the Layer 3 protocol can be the IPX (Internetworking Packet Exchange Protocol), Apple-Talk and various other network protocols of different versions. Moreover, in the exemplary embodiment, the node 44 is depicted as a mobile device communicating with the NAS 46 wirelessly. It should be appreciated that the node 60 can very well be stationary. Furthermore, the link 45 need not be an air link. Instead, the link 45 can be a wire link. In addition, any logical blocks, circuits, and algorithm steps described in connection with the embodiment can be implemented in hardware, software, firmware, or combinations thereof. It will be understood by those skilled in the art that theses and other changes in form and detail may be made therein without departing from the scope and spirit of the invention.

What is claimed is:

1. A method for a communication session with a node seeking network access, comprising:
   receiving, at a network access node from said node, a first message including a set of parameter options defining a plurality of configurations supported by said node for establishing network access, wherein the set of parameter options include at least one parameter option for authentication, a plurality of parameter options for link configuration, and a plurality of parameter options for network access;
   selecting a subset of the set of parameter options indicated in said first message for providing network access to said node, wherein the subset of the set of parameter options correspond to options supported by the network access node;
   sending, to said node in response to said first message, a second message indicating said subset of the set of parameter options from said first message that are supported by said access network node along with associated configuration values, wherein said second message facilitates establishing said network access with said network access node; and
   receiving user data from said node based at least in part on said selected subset of the set of parameter options and said associated configuration values indicated in said second message.

2. The method as in claim 1, wherein receiving said user data from said node comprises receiving said user data when the selected subset of the set of parameter options meets a threshold for said node to establish said network access.

3. The method as in claim 1, further including sending a sync message having a request for authentication from said node upon establishing a physical link with said node prior to receiving from said node said first message.

4. The method as in claim 3, further comprising receiving, via the physical link after establishing the physical link, a PPP (Point-to-Point Protocol) message from said node, and resorting to communicating with said node by sending another PPP message in response to said PPP message.

5. The method as in claim 1 further including exchanging echo messages with said node after a predetermined period of inactive communication with said node.

6. The method as in claim 1 further including communicating user data for said network access with said node and sending an authenticate message to said node during said network access.

7. An apparatus for a communication session with a node seeking network access, comprising:
   means for receiving from said node a first message including a set of parameter options defining a plurality of configurations supported by said node for establishing network access, wherein the set of parameter options include at least one parameter option for authentication, a plurality of parameter options for link configuration, and a plurality of parameter options for network access;
   means for selecting a subset of the set of parameter options indicated in said first message for providing network access to said node, wherein the subset of the set of parameter options correspond to options supported by the apparatus;
   means for sending, to said node in response to said first message, a second message indicating said subset of the set of parameter options from said first message that are supported by said apparatus along with associated configuration values, wherein said second message facilitates establishing said network access with said apparatus; and
   means for receiving user data from said node based at least in part on said selected subset of the set of parameter options and said associated configuration values indicated in said second message.

8. The apparatus as in claim 7, wherein said means for receiving said user data receives said user data for said network access from said node when the selected subset of the set of parameter options meets a threshold for said node to establish said network access.

9. The apparatus as in claim 7, further including means for sending a sync message having a request for authentication from said node upon establishing a physical link with said node prior to receiving from said node said first message.

10. The apparatus as in claim 7, further comprising means for receiving, via the physical link after establishing the physical link, a PPP (Point-to-Point Protocol) message from said node, and means for resorting to communicating with said node by sending another PPP message in response to said PPP message.

11. An apparatus for a communication session for network access via a network access node, comprising:
   a memory unit including computer-readable instructions for:
      providing a first message including a set of parameter options defining a plurality of configurations supported by said apparatus for establishing network access, wherein the set of parameter options include at least one parameter option for authentication, a plurality of parameter options for link configuration, and a plurality of parameter options for network access;
      sending said first message to said network access node;
      receiving, in response to said first message, a second message for establishing said network access from said network access node, wherein the second message includes a selected subset of the set of parameter options specified in the first message that are supported by the network access node along with associated configuration values; and
      transmitting user data to said network access node based at least in part on said selected subset of the set of parameter options and said associated configuration values specified in the second message when said selected subset of the set of parameter options meets a threshold for said apparatus to establish said network access; and a processor circuit coupled to said memory unit for processing said computer-readable instructions.

12. The apparatus as in claim 11, wherein said memory unit further comprises computer-readable instructions for commencing said network access when said selected subset of the set of parameter options meets a threshold for said apparatus to establish said network access.

13. The apparatus as in claim 11, wherein said memory unit further comprises computer-readable instructions for sending a third message having a second set of parameter options different from said set of parameter options in said first message to said network access node when said selected subset of the set of parameter options fails to meet a threshold for said apparatus to establish said network access.

14. The apparatus as in claim 11, further comprising a PPP (Point-to-Point Protocol) message received from said network access node after establishing a physical link, said memory unit further including computer-readable instructions for resorting to communicating with said network access node via sending another PPP message in response to said PPP message.

15. An apparatus for a communication session with a node seeking network access, comprising:

a memory unit including computer-readable instructions for:

receiving from said node a first message including a set of parameter options defining a plurality of configurations supported by said node for establishing network access, wherein the set of parameter options include at least one parameter option for authentication, a plurality of parameter options for link configuration, and a plurality of parameter options for network access;

selecting a subset of the set of parameter options indicated in said first message for providing network access to said node, wherein the subset of the set of parameter options correspond to options supported by the apparatus;

sending to said node a second message indicating the subset of the set of parameter options from the first message that are supported by said apparatus along with associated configuration values, wherein the second message facilitates for establishing said network access with said apparatus; and receiving user data from said node based at least in part on said selected subset of the set of parameter options and said associated configuration values indicated in said second message; and a processor circuit coupled to said memory unit for processing said computer-readable instructions.

16. The apparatus as in claim 15, wherein said memory unit further includes computer-readable instructions for receiving data for said network access from said node when the selected subset of the set of parameter options meets a threshold for said node to establish said network access.

17. The apparatus as in claim 15, wherein said memory unit further includes computer-readable instructions for sending a sync message having a request for authentication from said node upon establishing a physical link with said node prior to receiving from said node said first message.

18. The apparatus as in claim 15, further comprising a PPP (Point-to-Point Protocol) message from said node received via the physical link after establishing the physical link, and said memory unit further including computer-readable instructions for resorting to communicating with said node by sending another PPP message in response to said PPP message.

19. The apparatus as in claim 18 wherein said memory unit further comprising computer-readable instructions for providing a data packet for said second message having a data packet format substantially similar to the corresponding data packet format of said PPP messages.

20. The method as in claim 1, wherein the plurality of configurations further comprises each configuration having respective parameters, wherein at least a portion of the plurality of configurations have redundancy in at least a portion of the respective parameters.

21. The method as in claim 1, wherein receiving the set of parameter options further comprises receiving all available parameter options supported by said node.

22. The method as in claim 1, wherein selecting the subset of parameter options further comprising selecting the at least one parameter option for authentication, at least one of the plurality of parameter options for link configuration, and at least one of the plurality of parameter options for network access.

23. The method as in claim 1, further comprising receiving from said node a third message including a second set of parameter options different from said set of parameter options in the first message when the selected subset of the set of parameter options fails to meet a threshold for the node to establish said network access.

24. The method as in claim 3, wherein sending the sync message further comprises including a plurality of possible authentication options for said node to select from.

25. The apparatus as in claim 7, wherein the plurality of configurations further comprises each configuration having respective parameters, wherein at least a portion of the plurality of configurations have redundancy in at least a portion of the respective parameters.

26. The apparatus as in claim 7, wherein the sync message further comprises a plurality of possible authentication options for said node to select from.

27. The apparatus as in claim 15, wherein the plurality of configurations further comprises each configuration having respective parameters, wherein at least a portion of the plurality of configurations have redundancy in at least a portion of the respective parameters.

28. The apparatus as in claim 15, wherein the sync message further comprises a plurality of possible authentication options for said node to select from.

29. The apparatus as in claim 11, wherein the plurality of configurations further comprises each configuration having respective parameters, wherein at least a portion of the plurality of configurations have redundancy in at least a portion of the respective parameters.

30. The apparatus as in claim 11, wherein the sync message further comprises a plurality of possible authentication options to select from, and further comprising means for selecting one of the plurality of possible authentication options as the at least one parameter option for authentication for inclusion in the first message.

31. A method for a communication session for network access via a network access node, comprising:

providing, by a node, a first message including a set of parameter options defining a plurality of configurations supported by said node for establishing network access, wherein the set of parameter options include at least one parameter option for authentication, a plurality of parameter options for link configuration, and a plurality of parameter options for network access;

sending said first message to said network access node; and receiving, in response to said first message, a second message for establishing said network access from said network access node, wherein the second message includes a selected subset of the set of parameter options specified in the first message that are supported by the network access node along with associated configuration values; and transmitting user data to said network access node based at least in part on said selected subset of the set of parameter options and said associated configuration values specified in the second message when said selected subset of the set of parameter options meets a threshold for said node to establish said network access.

32. The method as in claim 31, further comprising commencing said network access when said selected subset of the set of parameter options meets a threshold for said node to establish said network access.

33. The method as in claim 31, further comprising sending a third message having a second set of parameter options different from said set of parameter options in said first message to said network access node when said selected subset of the set of parameter options fails to meet a threshold for said node to establish said network access.

34. The method as in claim 31, further comprising receiving a PPP (Point-to-Point Protocol) message from said network access node after establishing a physical link, and resorting to communicating with said network access node via sending another PPP message in response to said PPP message.

35. The method as in claim 31, wherein the plurality of configurations further comprises each configuration having respective parameters, wherein at least a portion of the plurality of configurations have redundancy in at least a portion of the respective parameters.

36. The method as in claim 31, wherein providing the subset of parameter options further comprises providing all available parameter options for link configuration, and all available parameter options for network access.

37. The method as in claim 31, wherein receiving the sync message further comprises receiving a plurality of possible authentication options to select from, and further comprising selecting one of the plurality of possible authentication options as the at least one parameter option for authentication for inclusion in the first message.

38. An apparatus for a communication session for network access via a network access node, comprising:

means for providing a first message including a set of parameter options defining a plurality of configurations supported by said apparatus for establishing network access, wherein the set of parameter options include at least one parameter option for authentication, a plurality of parameter options for link configuration, and a plurality of parameter options for network access;

means for sending said first message to said network access node; and means for receiving, in response to said first message, a second message for establishing said network access from said network access node, wherein the second message includes a selected subset of the set of parameter options specified in the first message that are supported by the network access node along with associated configuration values; and means for transmitting user data to said network access node based at least in part on said selected subset of the set of parameter options and said associated configuration values specified in the second message when said selected subset of the set of parameter options meets a threshold for said apparatus to establish said network access.

39. The apparatus as in claim 38, further comprising means for commencing said network access when said selected subset of the set of parameter options meets a threshold for said apparatus to establish said network access.

40. The apparatus as in claim 38, wherein the plurality of configurations further comprises each configuration having respective parameters, wherein at least a portion of the plurality of configurations have redundancy in at least a portion of the respective parameters.

41. The apparatus as in claim 38, wherein the sync message further comprises a plurality of possible authentication options to select from, and further comprising means for selecting one of the plurality of possible authentication options as the at least one parameter option for authentication for inclusion in the first message.

42. A non-transitory computer-readable storage medium for use by an apparatus in a communication session for network access via a network access node in a communication system, comprising:

at least one instruction for providing a first message including a set of parameter options defining a plurality of configurations supported by said apparatus for establishing network access, wherein the set of parameter options include at least one parameter option for authentication, a plurality of parameter options for link configuration, and a plurality of parameter options for network access;

at least one instruction for sending said first message to said network access node; and at least one instruction for receiving, in response to said first message, a second message for establishing said network access from said network access node, wherein the second message includes a selected subset of the set of parameter options specified in the first message that are supported by the network access node along with associated configuration values; and at least one instruction for transmitting user data to said network access node based at least in part on said selected subset of the set of parameter options and said associated configuration values specified in the second message when said selected subset of the set of parameter options meets a threshold for said apparatus to establish said network access.

43. The computer-readable storage medium as in claim 42, further comprising at least one instruction for commencing said network access when said selected subset of the set of parameter options meets a threshold for said apparatus to establish said network access.

44. The computer-readable storage medium as in claim 42, wherein the plurality of configurations further comprises each configuration having respective parameters, wherein at least a portion of the plurality of configurations have redundancy in at least a portion of the respective parameters.

45. The computer-readable storage medium as in claim 42, wherein the sync message further comprises a plurality of possible authentication options to select from, and further comprising at least one instruction for selecting one of the plurality of possible authentication options as the at least one parameter option for authentication for inclusion in the first message.

46. A non-transitory computer-readable storage medium for use by a network access node in a communication session for network access with a node in a communication system, comprising:

at least one instruction for receiving from said node a first message including a set of parameter options defining a plurality of configurations supported by said node for establishing network access, wherein the set of parameter options include at least one parameter option for authentication, a plurality of parameter options for link configuration, and a plurality of parameter options for network access;

at least one instruction for selecting a subset of the set of parameter options indicated in said first message for providing network access to said node, wherein the subset of the set of parameter options correspond to options supported by the apparatus; and at least one instruction for sending, to said node in response to said first message, a second message indicating said subset of the set of parameter options from said first message that are supported by said access network node along with associated configuration values, wherein said second message facilitates establishing said network access with said network access node; and at least one instruction for receiving user data from said node based at least in part on said selected subset of the set of parameter options and said associated configuration values indicated in said second message.

47. The computer-readable storage medium as in claim 46, further comprising at least one instruction for receiving said user data for said network access from said node when the selected subset of the set of parameter options meets a threshold for said node to establish said network access.

48. The computer-readable storage medium as in claim 46, wherein the plurality of configurations further comprises each configuration having respective parameters, wherein at least a portion of the plurality of configurations have redundancy in at least a portion of the respective parameters.

49. The computer-readable storage medium as in claim 46, wherein the sync message further comprises a plurality of possible authentication options for said node to select from.

* * * * *